No. 819,137. PATENTED MAY 1, 1906.
J. E. HERMAN.
DENTAL MATRIX RETAINER.
APPLICATION FILED AUG. 14, 1905.

Witnesses:

John E. Herman, Inventor,
by Attorneys.

UNITED STATES PATENT OFFICE.

JOHN E. HERMAN, OF SANDUSKY, OHIO.

DENTAL MATRIX-RETAINER.

No. 819,137.

Specification of Letters Patent.

Patented May 1, 1906.

Application filed August 14, 1905. Serial No. 274,201.

*To all whom it may concern:*

Be it known that I, JOHN E. HERMAN, a citizen of the United States, residing at Sandusky, in the county of Erie and State of Ohio, have invented a new and useful Dental Matrix-Retainer, of which the following is a specification.

This invention relates to dental matrix-retainers.

The object of the invention is to provide a novel form of matrix-retainer which may readily be operated to clamp a matrix against the surface of a tooth to be filled, and, further, to provide a novel means whereby the matrix will be retained in positive engagement with the tooth during the operation of filling.

With the above and other objects in view, as will appear as the nature of the invention is better understood, the same consists in the novel construction and combination of parts of a dental matrix-retainer, as will be hereinafter fully described and claimed.

Figure 1:
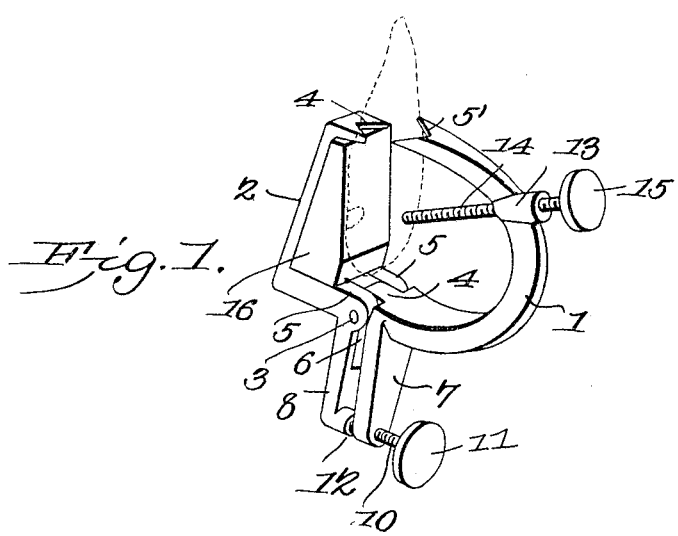
Figure 2:
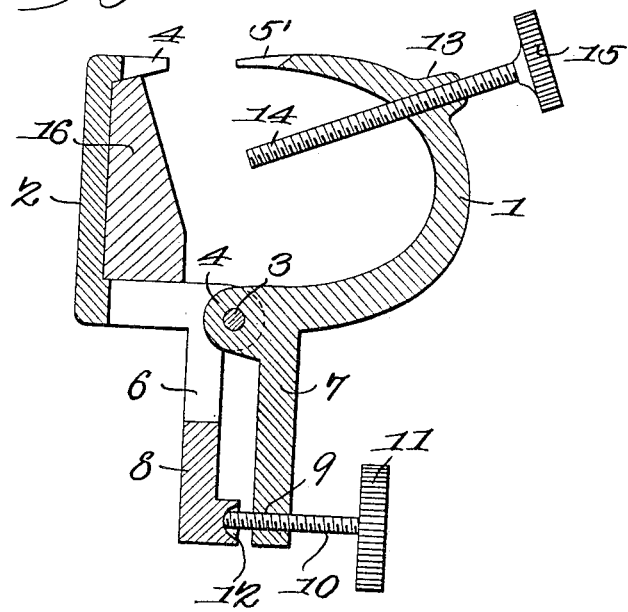

In the accompanying drawings, forming a part of this specification, and in which like characters of reference indicate corresponding parts, Figure 1 is a view in perspective exhibiting the matrix-retainer combined with an incisor, the latter being indicated by dotted lines. Fig. 2 is a vertical sectional view, on an enlarged scale, through the retainer, exhibiting the matrix combined therewith.

The clamp or matrix-retainer embodies two members 1 and 2, which are connected for pivotal movement relatively to each other by a pivot 3, that passes through an ear 4, carried by the member 1, and a pair of ears 5, carried by the member 2, the latter member being provided with a recess 6 to permit free movement of the members. Each of the members terminates in a bifurcated tooth-engaging jaw 4 and 5', respectively, the member 1 being approximately semicircular in form and the member 2 being approximately an open-sided rectangle in form. The object for making the member 1 of the shape shown is to permit the requisite adjustments of the implement relatively to the tooth to be filled, the member 2 remaining stationary under the different adjustments to which the member 1 will be subjected when being positioned. Each of the members 1 and 2 is constructed with or has secured to it a shank 7 and 8, respectively, the shank 7 being provided with a threaded transverse orifice 9, which is engaged by an adjusting-screw 10, the outer end of which carries a knurled head 11 and the inner end of which fits loosely within a socket 12, formed on the inner face of the shank 8. The member 1 is provided with a threaded boss 13, which is engaged by a tooth-clamping screw or member, the outer end of which carries a knurled head 15.

As will be seen by reference to Fig. 2 the tooth-clamping member 14 is disposed obliquely to the member 2, this arrangement permitting the member 14 readily to be brought into engagement with the anterior surface of a tooth, thus to cause it to be properly seated upon a matrix 16 and also to preclude any possibility of the matrix moving away from the tooth during the operation of filling, the matrix being made preferably of wood and being approximately wedge-shaped, thus to conform accurately to the posterior portion of a tooth.

In the use of the implement the clamping-jaws are brought into engagement with a tooth adjacent to the gum, and by turning the screw 10 the proper securing of the retainer will be effected, it being understood, of course, that the matrix is positioned at this period of the operation. By bringing the inner end of the screw 14 into engagement with the anterior surface of the tooth the latter is caused positively to be clamped against the matrix and at the same time held against any tendency to move outward during the operation of filling. When all the parts are properly adjusted, the cavity will be filled and by being built out against the matrix will cause the tooth to resume its original shape.

While it will generally be preferred to employ a wooden matrix, it is to be understood that the invention is not to be limited thereto, as any substance found adaptable for the purpose may be employed and still be within the scope of the invention.

Having thus described the invention, what is claimed is—

1. An implement of the class described embodying a pair of pivotally-connected tooth-engaging members having bifurcated terminals, a matrix combined with one of the members, and a tooth-clamping member carried by the other member.

2. An implement of the class described embodying a pair of pivotally-connected tooth-engaging members, means carried by one of the members to cause the two members to approach each other, a matrix carried by one of the members, and a tooth-clamping element carried by the other member and disposed obliquely thereto.

3. An implement of the class described embodying a pair of pivotally-connected tooth-engaging members having bifurcated terminals, means for adjusting the members relatively to each other, a matrix carried by one of the members, and an angularly-disposed tooth-clamping element carried by the other member.

4. An implement of the class described comprising a pair of pivotally-connected tooth-engaging members provided with bifurcated terminals, one of the members being approximately rectangular in shape, and the other approximately semicircular in shape, means for causing the bifurcated portions of the members to approach each other, and a tooth-clamping element carried by the curved member and disposed obliquely with relation to the other member.

In testimony that I claim the foregoing as my own I have hereto affixed my signature in the presence of two witnesses.

JOHN E. HERMAN.

Witnesses:
PHILIP DIETRICH,
WILLIAM L. FRISINGER.